US012392364B2

(12) United States Patent
Neumair et al.

(10) Patent No.: US 12,392,364 B2
(45) Date of Patent: Aug. 19, 2025

(54) DEVICE AND METHOD FOR DIAGNOSING AND CONFIGURING A HYDRAULIC DEVICE BASED ON WIRELESS LOCAL AREA NETWORK

(71) Applicant: HAWE Hydraulik SE, Aschheim (DE)

(72) Inventors: Markus Neumair, Aschheim (DE); Benjamin Hasner, Aschheim (DE); Daiwei Zhou, Shanghai (CN); Xiaojun Chen, Shanghai (CN); Wenbin Xie, Shanghai (CN)

(73) Assignee: HAWE Hydraulik SE, Aschheim (DE)

( * ) Notice: Subject to any disclaimer, the term of this patent is extended or adjusted under 35 U.S.C. 154(b) by 341 days.

(21) Appl. No.: 17/820,983

(22) Filed: Aug. 19, 2022

(65) Prior Publication Data
US 2023/0058633 A1 Feb. 23, 2023

(30) Foreign Application Priority Data

Aug. 20, 2021 (CN) .......................... 202110971126.3

(51) Int. Cl.
F15B 19/00 (2006.01)
G06F 16/958 (2019.01)
H04W 4/38 (2018.01)
H04W 84/12 (2009.01)

(52) U.S. Cl.
CPC .......... F15B 19/005 (2013.01); G06F 16/958 (2019.01); H04W 4/38 (2018.02); H04W 84/12 (2013.01); F15B 2211/87 (2013.01)

(58) Field of Classification Search
CPC ................ F15B 19/005; F15B 2211/87; F15B 13/0867; F15B 21/085; G06F 16/958; H04W 4/38; H04W 84/12
See application file for complete search history.

(56) References Cited

U.S. PATENT DOCUMENTS

2018/0119972 A1* 5/2018 Trikha ..................... F24F 11/62
2019/0356740 A1* 11/2019 Yuan ........................ H04Q 9/00

FOREIGN PATENT DOCUMENTS

CN 107404528 A 11/2017

* cited by examiner

Primary Examiner — Walter L Lindsay, Jr.
Assistant Examiner — Geoffrey T Evans
(74) Attorney, Agent, or Firm — DINSMORE & SHOHL LLP

(57) ABSTRACT

A device and method for diagnosing and configuring a hydraulic device based on a wireless local area network relates to diagnosis and configuration device technologies. The device includes a communication unit and mobile terminal. The communication unit reads hydraulic device data or changes device configuration, and process the data to generate webpage results. The mobile terminal transmits configuration requests, receives webpage results, and displays results in webpage form. The webpage results are formed by processing the acquired hydraulic device data at the communication unit side. The mobile terminal can complete the hydraulic device diagnosis and configuration, as long as it connects to the communication unit via WIFI and supports state of the art web content. The mobile terminal does not need additional installation of a matching diagnostic or configuration program, and is not limited as a specific device installed with a specific operating system; a general-purpose device may be used.

16 Claims, 3 Drawing Sheets

DEVICE AND METHOD FOR DIAGNOSING AND CONFIGURING A HYDRAULIC DEVICE BASED ON WIRELESS LOCAL AREA NETWORK

CROSS-REFERENCE TO RELATED APPLICATIONS

This application claims priority to Chinese Application no. 2021109711263, filed Aug. 20, 2021, which is hereby incorporated by reference in its entirety.

FIELD OF THE INVENTION

The present invention relates to the field of diagnosis and configuration technologies, and more particularly, to a device and method for diagnosing and configuring a hydraulic device based on a wireless local area network.

BACKGROUND OF THE INVENTION

In existing diagnosis and configuration technologies for a hydraulic device, a terminal device for diagnosis and configuration suffers from the following problems:
1. The terminal device for diagnosis and configuration must meet certain requirements (for example, a computer installed with a Microsoft Windows operating system is needed), and cannot use any general-purpose device;
2. The terminal device for diagnosis and configuration requires additional installation of a matching diagnosis or configuration program; and
3. There must be a wired connection between the terminal device for diagnosis and configuration and the hydraulic device, resulting in a certain limitation in space and a need for specific hardware.

SUMMARY OF THE INVENTION

In view of the deficiencies in the prior art, an objective of the present invention is to provide a device and method for diagnosing and configuring a hydraulic device based on a wireless local area network, which solves at least one of the above problems.

According to a first aspect of the present invention, a device for diagnosing and configuring a hydraulic device based on a wireless local area network is provided. The device comprises a communication unit and a mobile terminal. The communication unit is configured to be electronically connected to an electronic unit of the hydraulic device and configured to establish the wireless local area network. The mobile terminal is configured to be connected to the communication unit via the wireless local area network in order to display diagnosis results of the hydraulic device and/or to change a configuration of the hydraulic device. The communication unit is configured to host a webpage, which can be accessed by the mobile terminal when the mobile terminal is connected to the wireless local area network. The communication unit and the mobile terminal use a communication protocol to communicate with each other.

In particular, the electronic unit of the hydraulic device comprises a control unit and/or a sensor of the hydraulic device. In particular, the mobile terminal can comprise a smartphone, a tablet, a laptop or a personal computer, for example. In particular, the webpage can be accessed by the mobile terminal via a browser. In particular, the communication protocol can be an HTTP protocol, a websocket protocol or another suitable communication protocol. In particular, the device according to the present invention comprises the hydraulic device. In other words, the communication unit functions as a server which establishes a WIFI-network to which the mobile terminal can connect in order to access the webpage generated and hosted by the communication unit.

With the device according to the present invention, it is possible to generate the webpage, that is to be accessed by the mobile terminal, in the communication unit so that the mobile terminal itself does not need any additional specific programs installed thereon to perform the diagnosis and/or the configuration of the hydraulic device. The diagnosis and configuration can instead be conducted via the webpage generated by the communication unit and accessed by the mobile terminal via any kind of standard browser installed on such a mobile terminal by default.

In some embodiments, the communication unit is configured to read status data of the hydraulic device in response to a diagnosis event, and process the status data to generate a webpage text diagnosis result and the mobile terminal is configured to receive the webpage text diagnosis result and display the diagnosis result in a webpage form. In particular, the diagnosis event can be an HTTP diagnosis request or a websocket diagnosis event. In particular, the mobile terminal is configured to transmit an HTTP diagnosis request if the used communication protocol is an HTTP protocol. Therefore, the webpage text diagnosis result is formed by processing the acquired status data of the hydraulic device at the communication unit side, such that the mobile terminal can complete the diagnosis of the hydraulic device, as long as it has the functions of connecting to the communication unit via WIFI, communicating with the communication unit using the communication protocol and displaying the webpage text diagnosis result. Therefore, the mobile terminal does not need additional installation of a matching diagnosis program, and the mobile terminal is no longer limited as a specific device that needs to be installed with a specific operating system, e.g., a computer with a Microsoft Windows operating system, with a matching diagnosis and configuration program installed, and a general-purpose device may be used.

In some embodiments, the communication unit is configured to modify a configuration of the hydraulic device in response to a configuration request received via the webpage from the mobile terminal. In particular, the configuration request is an HTTP configuration request if the used communication protocol is an HTTP protocol. In particular, the modification of the configuration comprises a changing of specific settings of the hydraulic device. Therefore, the configuration of the hydraulic device can be performed using the communication unit and the mobile terminal without the need for specific programs to be installed on the mobile terminal.

In some embodiments, the communication unit comprises a first processing module in which a wireless communication module is built, wherein the first processing module is in wireless communication with the mobile terminal through the wireless communication module and a second processing module which is connected between the first processing module and the hydraulic device. Therefore, the first processing module establishes the connection with the mobile terminal and the second processing module establishes the connection with the hydraulic device.

In some embodiments, the first processing module is configured to transmit a read instruction in response to the diagnosis event, in particular an HTTP diagnosis request, the second processing module is configured to read the status data of the hydraulic device in response to the read instruction and transmit the status data to the first processing module, and the first processing module is configured to process the status data to generate the webpage text diagnosis result, and transmit the webpage text diagnosis result to the mobile terminal through the wireless communication module. Therefore, the wireless communication between the communication device and the mobile terminal is completed through the wireless communication module, which solves the problem of space limitation caused by a wired connection between the communication device and the mobile terminal.

In some embodiments, the first processing module is configured to transmit a write instruction in response to the configuration request, in particular the HTTP configuration request, and the second processing module is configured to change the configuration of the hydraulic device in response to the write instruction. Therefore, the wireless communication between the communication device and the mobile terminal is completed through the wireless communication module, which solves the problem of space limitation caused by a wired connection between the communication device and the mobile terminal.

In some embodiments, a storage module is further connected to the first processing module and configured to store the diagnosis result processed by the first processing module; and when the mobile terminal transmits a download instruction, the first processing module downloads the diagnosis result from the storage module and transmits the diagnosis result to the mobile terminal. Therefore, the diagnosis results are stored for evaluation at a later point in time or at a different location.

In some embodiments, the communication unit further comprises an indicator lamp module comprising an LED lamp comprising at least one set of red, green and blue three-color lamps, and the communication unit further comprises a third processing module which is connected between the first processing module and the LED lamp and configured to control the LED lamp to be turned on based on the processing process of the first processing module.

In some embodiments, when the first processing module is in a diagnosis state, the third processing module controls a blue lamp in the LED lamp to be turned on, when the diagnosis result of the first processing module indicates that the hydraulic device is normal, the third processing module controls a green lamp in the LED lamp to be turned on, and, when the diagnosis result of the first processing module indicates that the hydraulic device has a fault, the third processing module controls a red lamp in the LED lamp to be turned on.

In some embodiments, the device further comprises the hydraulic device, wherein the hydraulic device comprises the communication unit. Therefore, the communication unit can be built into the hydraulic device which is to be diagnosed and configured by the device saving even more installation space.

In some embodiments, the device according to the present invention further comprises a separate communication device comprising the communication unit and the communication unit is connected to the hydraulic device via a serial bus, in particular a CAN bus. Therefore, multiple hydraulic devices can be connected to the separate communication device via the serial bus and the diagnostic and configuration capabilities of the communication unit in connection with the mobile terminal can be applied to the multiple hydraulic devices in a convenient manner.

In some embodiments, the device according to the present invention further comprises an other hydraulic device, wherein the communication unit is connected to an electronic unit of the other hydraulic device via a serial bus, in particular a CAN bus, and configured to perform a diagnosis of the other hydraulic device in response to a diagnosis event, in particular an HTTP diagnosis request transmitted by the mobile terminal, and to perform a configuration of the other hydraulic device in response to a configuration request, in particular an HTTP configuration request, transmitted by the mobile terminal.

In some embodiments, the communication device further comprises a power supply module, and the power supply module comprises an input voltage module which is connected to a socket and configured to adapt a voltage of an external power supply connected to the socket to a voltage value required for charging a battery of the communication device, and to charge the battery, and/or an output voltage module which is connected to the battery and configured to adapt the voltage of the battery to a working voltage value of the communication device to supply power to the communication device.

In some embodiments, the status data comprises at least one of a fault code, a fault occurrence time, a running status, a running time, and a sensor status.

In some embodiments, the hydraulic device is a hydraulic valve, in particular a CAN bus multi-way valve, or a hydraulic pump. Therefore, the device according to the present invention can be applied to a wide range of different hydraulic devices to implement diagnosis and configuration capabilities in an efficient and flexible manner.

According to another aspect of the present invention, a method for diagnosing and configuring a hydraulic device based on a wireless local area network is provided. The method is performed using the above-mentioned device. The method comprises opening a webpage on a mobile terminal, triggering a diagnosis or configuration operation, performing, by the communication unit, the diagnosis or configuration operation and generating, by the communication unit, a webpage result corresponding to the diagnosis or configuration operation, and processing, by the mobile terminal, the webpage result.

In some embodiments, triggering the diagnosis or configuration operation comprises a diagnosis event and performing the diagnosis or configuration operation comprises reading, by the communication unit, status data of the hydraulic device in response to the diagnosis event, and processing, by the communication unit, the status data to generate a webpage text diagnosis result. Processing the webpage result comprises receiving, by the mobile terminal, the webpage text diagnosis result, and displaying the webpage text diagnosis result through a webpage in a browser. In particular, the diagnosis event comprises transmitting, by the mobile terminal, an HTTP diagnosis request to the communication unit or triggering the diagnosis or configuration operation in response to a predetermined change in an internal value of the communication unit, such as a timestamp, or a status update of the hydraulic device, wherein the diagnosis or configuration operation is a diagnosis operation.

In some embodiments, triggering the diagnosis or configuration operation comprises transmitting, by the mobile terminal, a configuration request, in particular an HTTP configuration request, to the communication unit, and performing the diagnosis or configuration operation comprises changing, by the communication unit, the configuration of the hydraulic device in response to the configuration request and processing, by the communication unit, configuration data transmitted by the hydraulic device in response to the changing of the configuration to generate a webpage text configuration result. Processing the webpage result comprises receiving, by the mobile terminal, the webpage text configuration result and displaying the webpage text configuration result through a webpage in a browser.

In some embodiments, the mobile terminal is in wireless communication with the communication unit through a wireless communication module and/or the status data comprises at least one of a fault code, a fault occurrence time, a running status, a running time, and a sensor status.

In some embodiments, when the mobile terminal sends a download instruction, a diagnosis result is downloaded from the storage module and transmitted to the mobile terminal through the wireless communication module and/or when the communication unit is in a diagnosis state, a blue lamp in an LED lamp is turned on, when the diagnosis result of the communication unit indicates that the hydraulic device is normal, a green lamp in the LED lamp is turned on, and when the diagnosis result of the communication unit indicates that the device has a fault, a red lamp in the LED lamp is turned on.

According to another aspect of the present invention, a method for automatically displaying the webpage generated by the above-described device for diagnosing and configuring a hydraulic device comprises generating the webpage as a captive portal, so that all network requests issued by the mobile terminal are rerouted to the webpage automatically after the mobile terminal is connected to the communication unit.

According to another aspect of the present invention, a method for automatically establishing a wireless connection between the mobile terminal of the above-described device and the communication unit of the device is provided. The method comprises transmitting a network key of the communication unit to the mobile terminal via NFC (Near Field Communication) technology or via two-dimensional code scanning technology. In particular, a two-dimensional code is a QR code or a bar code.

According to another aspect of the present invention, a device for diagnosing a CAN bus multi-way valve based on a wireless local area network is provided. The device includes a communication device and a mobile terminal, wherein the communication device is connected to the CAN bus multi-way valve and configured to read status data of the CAN bus multi-way valve in response to an HTTP request, and process the status data to generate a webpage text diagnosis result, and the mobile terminal is connected to the communication device and configured to transmit the HTTP request and receive the webpage text diagnosis result, and display the diagnosis result in a webpage form.

According to the device for diagnosing the CAN bus multi-way valve based on the wireless local area network of the present invention, the webpage text diagnosis result is formed by processing the acquired status data of the CAN bus multi-way valve at the communication device side, such that the mobile terminal can complete the diagnosis of the CAN bus multi-way valve, as long as it has the functions of transmitting and displaying the HTTP request. Therefore, the mobile terminal does not need additional installation of a matching diagnosis program, and the mobile terminal is no longer limited as a specific device that needs to be installed with a specific operating system, e.g., a computer with a Microsoft Windows operating system, and a general-purpose device may be used.

In some embodiments, the communication device includes a first processing module and a second processing module, wherein a wireless communication module is built in the first processing module, and the first processing module is in wireless communication with the mobile terminal through the wireless communication module and configured to transmit a read instruction in response to the HTTP request, the second processing module is connected between the first processing module and the CAN bus multi-way valve, and configured to read the status data of the CAN bus multi-way valve in response to the read instruction and transmit the status data to the first processing module, and the first processing module is configured to process the status data to generate the webpage text diagnosis result, and transmit the webpage text diagnosis result to the mobile terminal through the wireless communication module. Therefore, the wireless communication between the communication device and the mobile terminal is completed through the wireless communication module, which solves the problem of space limitation caused by a wired connection between the communication device and the mobile terminal.

In some embodiments, a storage module is further connected to the first processing module and configured to store the diagnosis result processed by the first processing module; and when the mobile terminal sends a download instruction, the first processing module downloads the diagnosis result from the storage module and transmits the diagnosis result to the mobile terminal.

In some embodiments, the communication device further includes an indicator lamp module; the indicator lamp module includes an LED lamp and a third processing module; the LED lamp include at least one set of red, green and blue three-color lamps; and the third processing module is connected between the first processing module and the LED lamp and configured to control the LED lamp to be turned on based on the processing process of the first processing module.

In some embodiments, when the first processing module is in a diagnosis state, the third processing module controls a blue lamp in the LED lamp to be turned on; when the diagnosis result of the first processing module indicates that the CAN bus multi-way valve is normal, the third processing module controls a green lamp in the LED lamp to be turned on; and when the diagnosis result of the first processing module indicates that the CAN bus multi-way valve has a fault, the third processing module controls a red lamp in the LED lamp to be turned on.

In some embodiments, the communication device further includes a power supply module, and the power supply module includes: a step-down module which is connected to a socket and configured to reduce a voltage of an external power supply connected to the socket to a voltage value required for charging a battery, and charge the battery; and a boosting module which is connected to the battery and configured to boost the voltage of the battery to a working voltage value of the communication device to supply power to the communication device.

In some embodiments, the status data includes at least one of a valve group fault code, a fault occurrence time, a running status, a running time, and a sensor status.

According to another aspect of the present invention, a method for diagnosing a CAN bus multi-way valve based on a wireless local area network is provided. The method for diagnosing the CAN bus multi-way valve based on the wireless local area network is used to control the above-mentioned device for diagnosing the CAN bus multi-way valve based on the wireless local area network and includes: opening a webpage on a mobile terminal and transmitting an HTTP request to a communication device, reading, by the communication device, status data of the CAN bus multi-way valve in response to the HTTP request, and processing, by the communication device, the status data to generate a webpage text diagnosis result, and receiving, by the mobile terminal, the webpage text diagnosis result, and displaying the webpage text diagnosis result through a webpage.

In some embodiments, the mobile terminal is in wireless communication with the communication device through the wireless communication module and/or the status data includes at least one of a valve group fault code, a fault occurrence time, a running status, a running time, and a sensor status.

In some embodiments, when the mobile terminal sends a download instruction, a diagnosis result is downloaded from the storage module and transmitted to the mobile terminal through the wireless communication module, and/or when the communication device is in a diagnosis state, a blue lamp in an LED lamp is turned on, when the diagnosis result of the communication device indicates that the CAN bus multi-way valve is normal, a green lamp in the LED lamp is turned on, and when the diagnosis result of the communication device indicates that the CAN bus multi-way valve has a fault, a red lamp in the LED lamp is turned on.

Compared with the prior art, according to the device for diagnosing and configuring the hydraulic device based on the wireless local area network in accordance with the present invention, the processing of the relevant data for diagnosing and/or configuring the hydraulic device is conducted at the communication unit side, such that the mobile terminal can complete the diagnosis and/or configuration of the hydraulic device, as long as it has the functions of connecting to the communication unit via the wireless local area network and transmitting and displaying the respective HTTP requests. That means, as long as it has a browser installed and has WIFI capabilities. Therefore, the mobile terminal does not need additional installation of matching diagnosis or configuration programs, the mobile terminal is no longer limited as a specific device that needs to be installed with a specific operating system, e.g., a computer with a Microsoft Windows operating system, and a general-purpose device may be used as the mobile terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures, wherein.

DETAILED DESCRIPTION OF THE INVENTION

Figure 1:
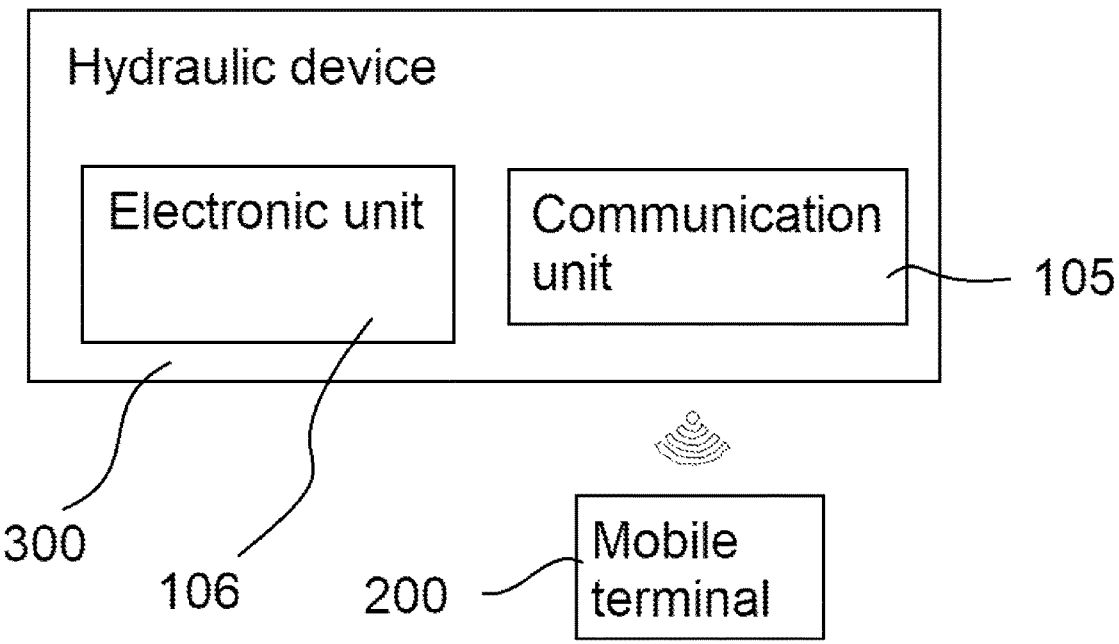
FIG. 1 is a schematic composition diagram of a device for diagnosing and configuring a hydraulic device based on a wireless local area network according to an embodiment of the present invention.

The present invention will be further explained below in conjunction with the accompanying drawings in which like reference numerals designate corresponding or identical elements.

FIG. 1 schematically shows a device for diagnosing and configuring a hydraulic device based on a wireless local area network in accordance with an embodiment of the present invention. The device comprises a communication unit 105 and a mobile terminal 200. The communication unit 105 is configured to be electronically connected to an electronic unit 106 of a hydraulic device 300 and configured to establish a wireless local area network. The mobile terminal 200 is configured to be connected to the communication unit 105 via the wireless local area network in order to display diagnosis results of the hydraulic device 300 and/or to change a configuration of the hydraulic device 300. The communication unit 105 is configured to host a webpage which can be accessed by the mobile terminal 200 when the mobile terminal 200 is connected to the wireless local area network. The communication unit 105 and the mobile terminal 200 use a communication protocol to communicate with each other. The mobile terminal 200 can access the webpage generated and hosted by the communication unit 105 via a browser. In other words, the communication unit 105 functions as a server which establishes a WIFI-network to which the mobile terminal 200 can connect in order to access the webpage generated and hosted by the communication unit 105.

As can be seen in FIG. 1, the communication unit 105 can be built into the hydraulic device 300. The electronic unit 106 of the hydraulic device 300 can be an electronic control unit and/or a sensor of the hydraulic device 300. The hydraulic device 300 can be a hydraulic valve or a hydraulic pump, for example.

With respect to FIGS. 2 to 4, an example embodiment of a device for diagnosing and configuring a hydraulic device 300 based on a wireless local area network will now be described. In this example, the hydraulic device 300 is a CAN bus multi-way valve. However, the person skilled in the art will readily see that the device according to the invention can be applied to other hydraulic devices such as other hydraulic valves or hydraulic pumps, for example. Additionally, the person skilled in the art will readily see that the concepts described below for the embodiment according to FIGS. 2 to 4 can also be applied to the embodiment according to FIG. 1 in which the communication unit is integrated into the hydraulic device 300.

Figure 2:
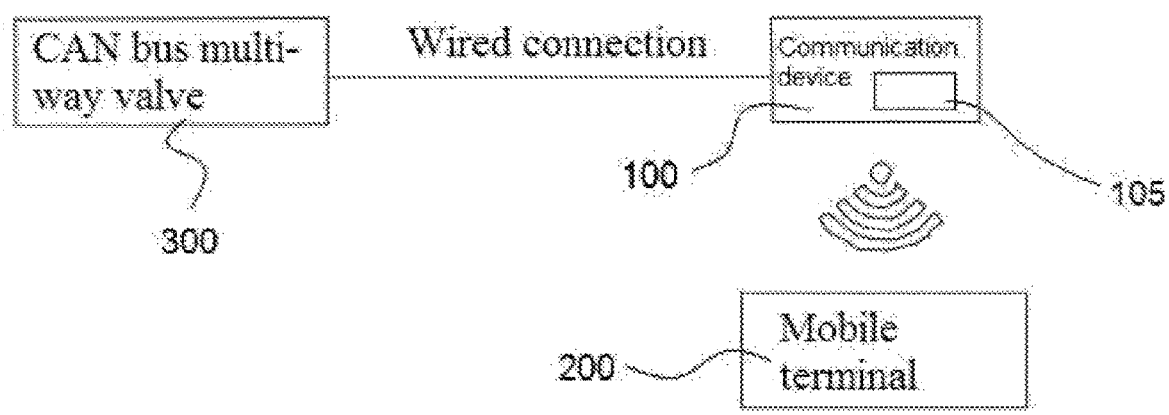
FIG. 2 is a schematic composition diagram of a device for diagnosing and configuring a CAN bus multi-way valve based on a wireless local area network according to an embodiment of the present invention.
Figure 3:
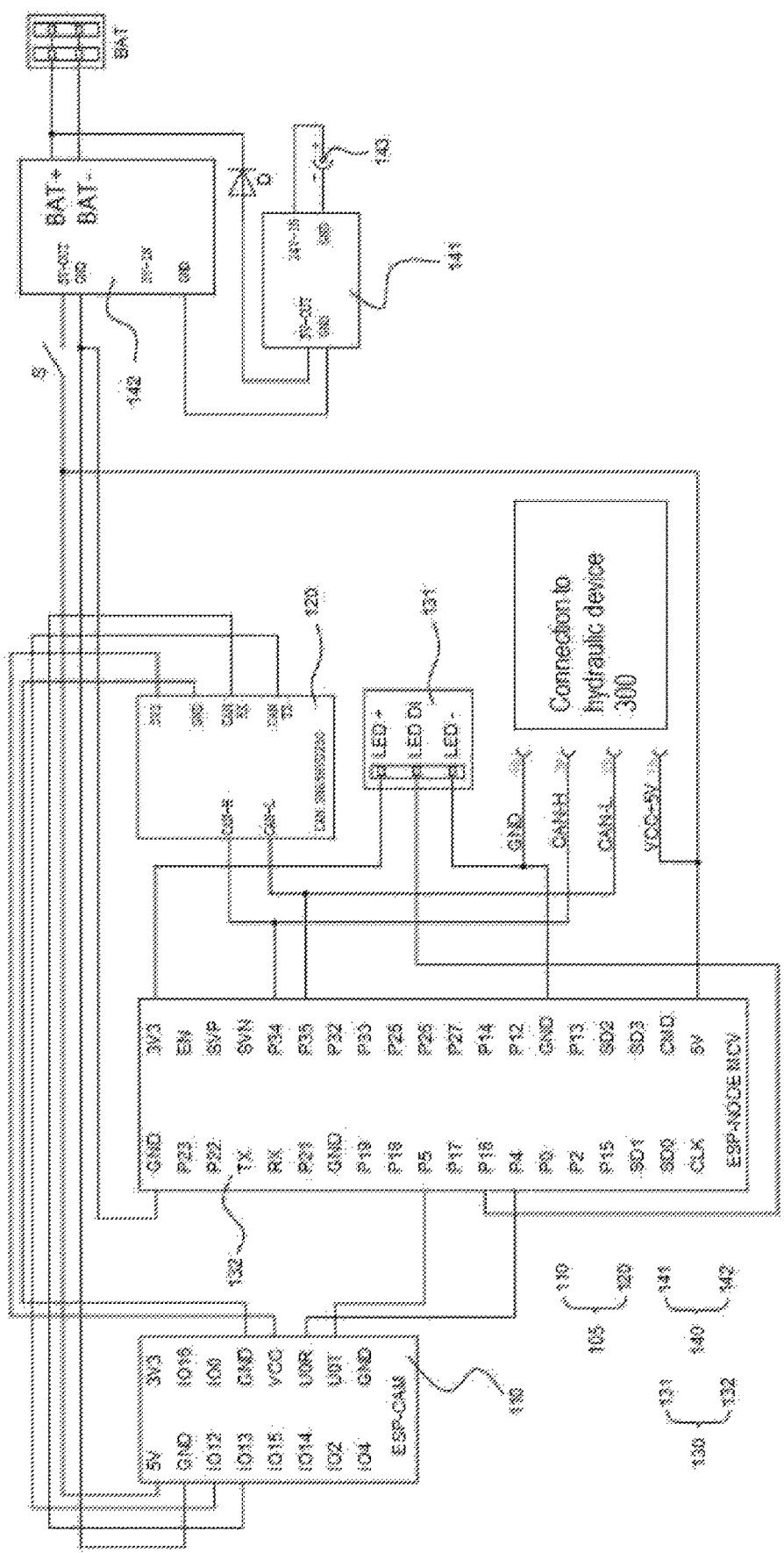
FIG. 3 is a schematic composition diagram of an internal circuit of a communication device according to an embodiment of the present invention.

FIGS. 2 to 3 schematically show a device for diagnosing and configuring a CAN bus multi-way valve based on a wireless local area network according to an embodiment of the present invention. The diagnosis and configuration device is configured to diagnose and configure the CAN bus multi-way valve. As shown in FIGS. 2 to 3, the device for diagnosing and configuring the CAN bus multi-way valve based on the wireless local area network includes a communication device 100 and a mobile terminal 200, where the communication device 100 is in wired connection with the CAN bus multi-way valve 300, and the communication device 100 is connected to the mobile terminal 200 through wireless communication. The mobile terminal 200 may be a mobile terminal such as a mobile phone, a tablet, or a computer.

The communication device 100 includes a communication unit 105 which includes a first processing module 110 and a second processing module 120. The first processing module 110 may be an ESP-CAM control module, or an ESP32 chip from Espressif Information Technology (Shanghai) Co., Ltd. The second processing module 120 may be a CAN SN65HVD230 data transceiver chip and configured for signal conversion. Of course, the above models are only used for illustration of the first processing module 110 and the second processing module 120, and chips of other models with the same function may also be used.

A wireless communication module is built in the first processing module 110. The first processing module 110 is in wireless communication with the mobile terminal 200 through the wireless communication module. The specific wireless communication is performed as follows: a user uses the mobile terminal 200 to connect the wireless communication module in communication unit 105 of the communication device 100 via a WIFI name and password or NFC touching or two-dimensional code scanning (OR code or bar code, for example); the user opens a browser on the mobile terminal 200, inputs a webpage address/IP address through NFC touching, two-dimensional code scanning or manual input, etc., or the browser and the webpage can be automatically opened via the webpage being generated as a captive portal by the communication unit 105, and sends an HTTP diagnosis request; the HTTP diagnosis request is transmitted to the communication device 100 through an HTTP protocol via WIFI; and the first processing module 110 is configured to respond to the HTTP diagnosis request, and convert the HTTP diagnosis request into a read instruction (that is, a serial communication signal) for the bus multi-way valve 300 by referring to a CAN protocol, and transmit the read instruction to the second processing module 120. Therefore, the wireless communication between the communication device 100 and the mobile terminal 200 is completed through the wireless communication module, which solves the problem of space limitation caused by a wired connection between the communication device 100 and the mobile terminal 200.

In this embodiment, the communication protocol used by the communication unit 105 and the mobile terminal 200 to communicate with each other is an HTTP protocol. However, the communication protocol can also be a websocket protocol or any other suitable type of communication protocol, which will be readily apparent to the person skilled in the art. If a websocket protocol is used, for example, there is no need for a specific diagnosis request such as the HTTP diagnosis request to be sent by the mobile terminal 200. Instead, the communication unit 105 can be configured to perform the diagnosis operations described herein in response to being triggered by a diagnosis event such as a predetermined change in an internal value, such as a timestamp, of the communication unit 105 or in response to being triggered by a status update of the hydraulic device 300.

The second processing module 120 is connected between the first processing module 110 and the CAN bus multi-way valve 300. Specifically, a transmitting terminal (CANTX) and a receiving terminal (CANRX) of the second processing module 120 are respectively connected to a receiving terminal (IO12) and a transmitting terminal (IO13) of the first processing module 110, and a CAN-H terminal and a CAN-L terminal of the second processing module 120 are connected to a CAN-H terminal and a CAN-L terminal of the CAN bus multi-way valve 300. Of course, the connection between the CAN-H and CAN-L terminals of the second processing module 120 and the CAN-H and CAN-L terminals of the CAN bus multi-way valve 300 can be implemented through D-SUB9, M12, M16 and other interfaces. The second processing module 120 is configured to read the status data of the CAN bus multi-way valve 300 in response to the read instruction, and transmit the status data to the first processing module 110. Specifically, the second processing module 120 converts the received serial communication signal into a CAN bus signal, and sends the CAN bus signal out through the CAN-H terminal and the CAN-L terminal. The CAN bus multi-way valve returns corresponding data, such as a valve group fault code, a fault occurrence time, an operating status, an operating time and a sensor status according to these instructions, and the corresponding data are sent out by the CAN-H and CAN-L terminals on the CAN bus multi-way valve and received by the CAN-H and CAN-L terminals of the second processing module 120. The second processing module 120 converts the received CAN bus signal into a serial communication signal, and the serial communication signal is sent out through the transmitting terminal (CANTX) and the receiving terminal (CANRX), and is received by the receiving terminal (IO12) and the transmitting terminal (IO13) of the first processing module 110. The first processing module 110 processes the above data, translates them into a text, generates a webpage, and sends the webpage to the mobile terminal 200 through HTTP and WIFI. Therefore, the webpage text diagnosis result is formed by processing the acquired status data of the CAN bus multi-way valve 300 at the communication device 100 side, such that the mobile terminal 200 can complete the diagnosis of the CAN bus multi-way valve 300 as long as it has the functions of transmitting and displaying the HTTP diagnosis request. Therefore, the mobile terminal 200 does not need additional installation of a matching diagnosis program, the mobile terminal 200 is no longer limited as a specific device that needs to be installed with a specific operating system, e.g., a computer with a Microsoft Windows operating system, and a general-purpose device may be used.

A storage module (not shown) is further connected to the first processing module 110, wherein the storage module may be a storage medium such as a SD card, a hard disk, or a floppy disk. The specific connection way is as follows: storage terminals (IO2, IO14 and IO15) of the first processing module 110 are connected to the storage module; and the storage module is configured to store the diagnosis result processed by the first processing module 110. A webpage on a screen of the mobile terminal 200 has buttons for "display diagnosis result" and "download report". When the user clicks the "Download Report" button on the webpage of the mobile terminal 200, a command is transmitted to the first processing module 110 in the communication unit 105 of the communication device 100 through HTTP/WIFI, the first processing module 110 downloads the previously generated diagnosis result from the storage module through the storage terminals (IO2, IO14 and IO15) to form a diagnosis report file, and the first processing module 110 on the communication unit 105 of the communication device 100 transmits the diagnosis report file to the mobile terminal 200 through WIFI/HTTP.

The communication device 100 further includes an indicator lamp module 130. The indicator lamp module 130 includes: an LED lamp 131 and a third processing module 132, wherein the third processing module 132 may be an ESP-NODE MCV module, or an ESP-32 control chip. Of course, the above models are only for illustration of the third processing module 132, and other model chips with the same function may also be used. The LED lamp includes at least one set of red, green and blue three-color lamps, and the LED lamp may be an annular LED lamp. The third processing module is connected between the first processing module and the LED lamp. Specifically, a positive terminal and a negative terminal of the LED lamp are connected to a power supply terminal (3V3) and a GND terminal of the third processing module 132 for power supply; a control terminal of the LED lamp is connected to a control terminal (P16) of the third processing module 132; first input terminals (P4, P5) of the third processing module 132 are connected to output terminals (UOR, UOT) of the first processing module 110; and second input terminals (P34, P35) of the third processing module 132 are connected to output terminals (CAN-H and CAN-L) of the second processing module 120. In the case that the mobile terminal 200 is not connected to the communication device 100, a blue lamp in the LED lamp can be turned on (the blue lamp works alone and does not participate in other steps). In the case that the mobile terminal 200 is connected to the communication device 100, all the lamps in the LED lamp are turned on to serve as blue breathing lamps, which change from bright to dark, and then from dark to bright over time, and so on. When the first processing module 110 is in a diagnosis state, the third processing module 132 controls the blue lamp in the LED lamp 131 to be turned on; when the diagnosis result of the first processing module 110 indicates that the CAN bus multi-way valve 300 is normal, the third processing module 132 controls the green lamp in the LED lamp 131 to be turned on; and when the diagnosis result of the first processing module 110 indicates that the CAN bus multi-way valve 300 has a fault, the third processing module 132 controls the red lamp in the LED lamp 131 to be turned on. Of course, each judgment step may also correspond to a set of three-color lamps. The blue lamp is turned on in the progress of the judgment step; the red and green lamps are selected to be turned on according to the judgment result, and the blue lamp corresponding to this step is turned off; and while entering the next judgment step, the blue lamp corresponding to this step is turned on, and so on.

The communication device 100 further includes a power supply module 140. The power supply module 140 includes; an input voltage module 141 which is connected to a socket 143 and configured to adapt a voltage of an external power supply connected to the socket 143 to a voltage value required for charging a battery BAT, and charge the battery BAT; and an output voltage module 142 which is connected to the battery BAT and configured to adapt the voltage of the battery BAT to a working voltage value of the communication device 100 to supply power to the communication device 100. Specifically, the input voltage module 141 is a step-down module 141 configured to reduce the voltage of the external power supply. Specifically, the output voltage module 142 is a boosting module 142 configured to boost the voltage of the battery. The input voltage module 141 can also be a boosting module, if required. The output voltage module 142 can also be a step-down module, if required. An anode and a cathode of the socket 143 are respectively connected to a 24V-IN terminal and a GND terminal of the step-down module 141; a 5V-OUT terminal of the step-down module 141 is connected to an anode of the boosting module 142 via a diode D; and the GND terminal of the step-down module 141 is connected to a GND terminal of the boosting module 142. An anode and a cathode of the boosting module 142 are connected to an anode and a cathode of the battery BAT respectively. A 5V-OUT terminal of the boosting module 142 supplies power to other modules. A switch S may also be provided at the 5V-OUT terminal of the boosting module 142 for turning the communication device 100 on or off.

For the diagnosis and configuration device, a function of modifying parameters of the CAN bus multi-way valve 300 in order to configure the CAN bus multi-way valve 300 (hydraulic device) is also included. This function is implemented by using the similar steps to those of the diagnosis function, except for the following difference: the CAN bus multi-way valve 300 does not return fault information, but returns whether the modification is successful; and the CAN bus multi-way valve 300 can return a text of successful modification if a parameter is modified successfully, or a text of successful failure if the parameter is not modified successfully. In that case, the communication unit 105 generates a corresponding webpage text configuration result indicating the success or failure of the intended configuration of the parameter of the CAN bus multi-way valve 300 which is then received and displayed by the mobile terminal 200 through a webpage in a browser.

Figure 4:
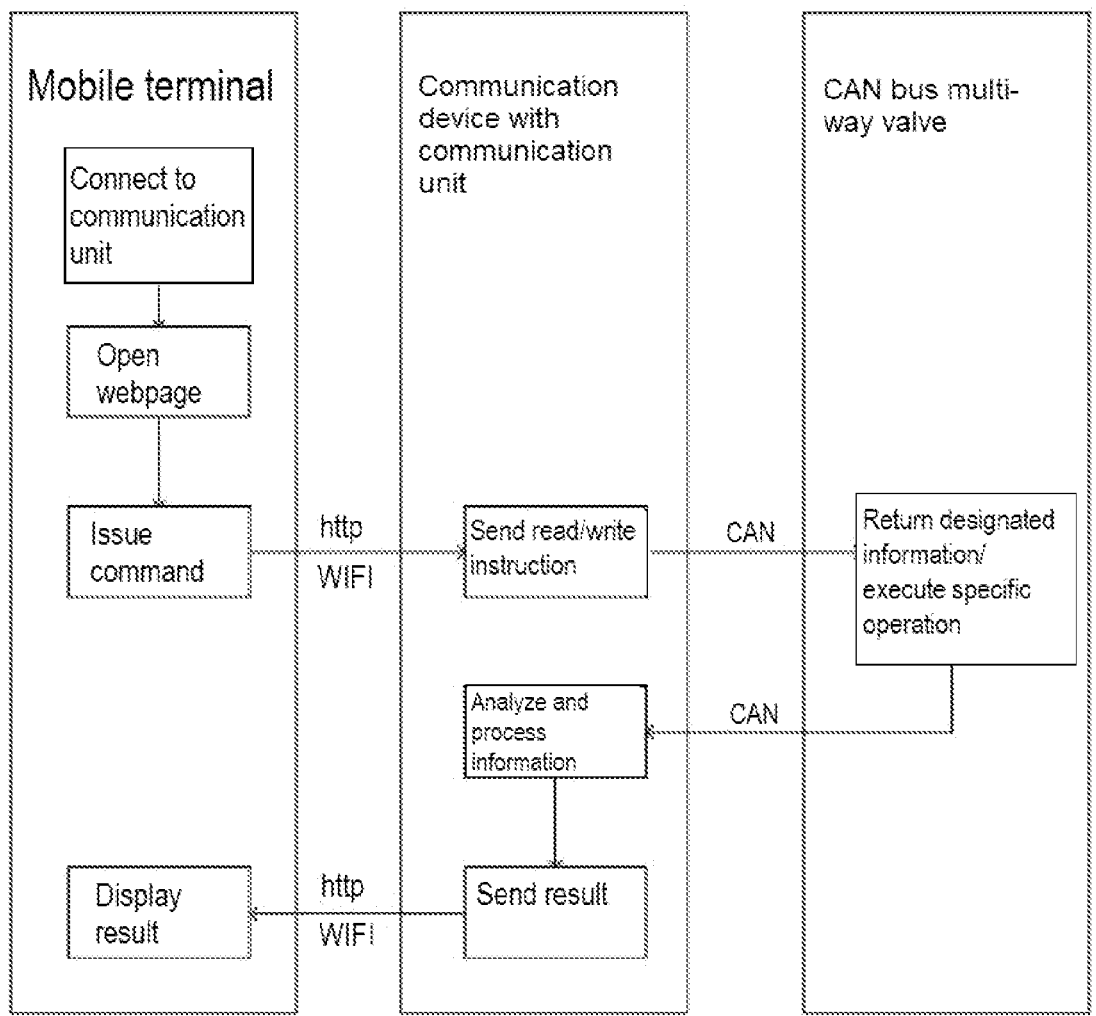
FIG. 4 is a flowchart of a method for diagnosing a CAN bus multi-way valve based on a wireless local area network according to an embodiment of the present invention.

As shown in FIG. 4, according to another aspect of the present invention, a method for diagnosing and configuring a hydraulic device based on a wireless local area network is provided. The method for diagnosing and configuring the hydraulic device based on the wireless local area network is used to control the above-mentioned device for diagnosing and configuring the hydraulic device based on the wireless local area network. The method includes the following steps.

A webpage is opened on a mobile terminal, and an HTTP request is sent to a communication unit. An operation in response to the HTTP request is performed by the communication unit and a webpage result corresponding to that operation is generated by the communication unit. The webpage result is then processed by the mobile terminal.

The method is explained below by example of the CAN bus multi-way valve 300 and the communication device 100.

Specifically, a user uses a mobile terminal 200 to connect a wireless communication module in the communication unit 105 of the communication device 100 through a WIFI name and password or NFC touching or two-dimensional code scanning; the user opens a browser on the mobile terminal 200, inputs a webpage address/IP address through NFC touching, two-dimensional code scanning or manual input, etc., or the browser and the webpage can be automatically opened via the webpage being generated as a captive portal by the communication unit 105, and sends an HTTP diagnosis request or an HTTP configuration request; and the HTTP diagnosis request or HTTP configuration request is sent to the communication device 100 through an HTTP protocol via WIFI.

The webpage is generated and hosted by the communication unit 105. The communication unit 105 can generate the webpage as a captive portal, so that all network requests issued by the mobile terminal 200 are rerouted to the webpage automatically after the mobile terminal 200 is connected to the communication unit 105. Thus, there is no need to specifically open a browser and the webpage as this occurs automatically after connecting to the WIFI-network established by the communication unit 105 since the webpage is generated as a captive portal.

In case the HTTP request is the HTTP diagnosis request, the communication unit 105 of the communication device 100 reads the status data of the CAN bus multi-way valve 300 in response to the HTTP diagnosis request, and processes the status data to generate a webpage text diagnosis result. Specifically, the communication unit 105 of the communication device 100 responds to the HTTP diagnosis request, and converts this HTTP diagnosis request into a read instruction (i.e., a serial communication signal) for the CAN bus multi-way valve 300 by referring to a CAN protocol. The CAN bus multi-way valve 300 returns corresponding data, such as a valve group fault code, a fault occurrence time, an operating status, an operating time and a sensor status according to these instructions. The communication unit 105 of the communication device 100 processes the above data, translates the data into a text, generates a webpage, and transmits the webpage to the mobile terminal 200 through HTTP and WIFI.

The mobile terminal 200 receives the webpage text diagnosis result, and displays the webpage text diagnosis result through a webpage.

As will be readily apparent to those skilled in the art, if the communication protocol used for communication between the communication unit 105 and the mobile terminal 200 allows it, as is the case with a websocket protocol, for example, there is no need for the mobile terminal 200 to send a specific diagnosis request before receiving the webpage text diagnosis result.

In case the HTTP request is the HTTP configuration request, the communication unit 105 of the communication device 100 changes the configuration of the CAN bus multi-way valve 300 in response to the HTTP configuration request, and processes the return data to generate a webpage text configuration result. Specifically, the communication unit 105 of the communication device 100 responds to the HTTP configuration request, and converts this HTTP configuration request into a write instruction a serial communication signal) for the CAN bus multi-way valve 300 by referring to a CAN protocol. The CAN bus multi-way valve 300 returns corresponding data, such as a parameter changing success code or a parameter changing failure code. The communication unit 105 of the communication device 100 processes the above data, translates the data into a text, generates a webpage, and transmits the webpage to the mobile, terminal 200 through HTTP and WIFI.

The mobile terminal 200 receives the webpage text configuration result, and displays the webpage text configuration result through a webpage.

When the mobile terminal 200 transmits a download instruction, the diagnosis result is downloaded from the storage module and transmitted to the mobile terminal through the wireless communication module. Specifically, a "Download Report" button on the webpage of the mobile terminal 200 is clicked, and a command is then transmitted to the communication unit 105 of the communication device 100 through HTTP/WIFI, such that the communication unit 105 of the communication device 100 downloads the previously generated diagnosis result from the storage module to form a diagnosis report file, and the communication unit 105 of the communication device 100 transmits the diagnosis report file to the mobile terminal 200 through WIFI/HTTP.

In the case that the mobile terminal 200 is not connected to the communication unit 105 of the communication device 100, a blue lamp in the LED lamp can be turned on (the blue lamp works alone and does not participate in other steps). In the case that the mobile device 200 is connected to the communication unit 105 of the communication device 100, all the lamps in the LED lamp are turned on to serve as blue breathing lamps, which change from bright to dark, and then from dark to bright over time, and so on. When the communication unit 105 of the communication device 100 is in a diagnosis state, a blue lamp in the LED lamp is controlled to be turned on; when the diagnosis result of the communication unit 105 indicates that the CAN bus multi-way valve 300 is normal, a green lamp 131 in the LED lamp is controlled to be turned on; and when the diagnosis result of the communication unit 105 indicates that the CAN bus multi-way valve 300 has a fault, a red lamp in the LED lamp is controlled to be turned on. Of course, each judgment step may also correspond to a set of three-color lamps. The blue lamp is turned on in the progress of the judgment step; the red and green lamps are selected to be turned on according to the judgment result, and the blue lamp corresponding to this step is turned off; and while entering the next judgment step, the blue lamp corresponding to this step is turned on, and so on.

It will be readily apparent to the person skilled in the art, that more than one hydraulic device such as the CAN bus multi-way valve 300 can be connected to the communication unit 105. Either if the communication unit 105 is part of the communication device 100 or if the communication unit 105 is part of another hydraulic device. That way, the communication unit 105 is capable of providing diagnosis and configuration capabilities to multiple hydraulic devices such as different hydraulic valves or hydraulic pumps by connecting to the mobile terminal via the WIFI connection and processing the diagnostic data received from the hydraulic devices and configuration requests received from the mobile terminal.

Compared with the prior art, according to the device and method for diagnosing and configuring the hydraulic device based on the wireless local area network of the present invention, the webpage text diagnosis result and webpage text configuration result are generated by processing the acquired data of the hydraulic device and the configuration requests received from the mobile terminal at the communication unit side, such that the mobile terminal can complete the diagnosis and configuration of the hydraulic device, as long as it has the functions of connecting to the communication unit via WIFI and supporting state of the art web content. Therefore, the mobile terminal does not need additional installation of matching diagnosis or configuration programs, the mobile terminal is no longer limited as a specific device that needs to be installed with a specific operating system, e.g., a computer with a Microsoft Windows operating system, and a general-purpose device may be used as the mobile terminal.

The foregoing is merely some of the embodiments of the present invention. For those of ordinary skill in the art, without departing from the concept of the present invention, several modifications and improvements can also be made, and these all fall within the protection scope of the present invention.

| REFERENCE SIGNS | |
|---|---|
| 100 | communication device |
| 105 | communication unit |
| 106 | electronic unit |
| 110 | first processing module |
| 120 | second processing module |
| 130 | indicator lamp module |
| 131 | LED lamp |
| 132 | third processing module |
| 140 | power supply module |
| 141 | input voltage module/step-down module |

-continued

| REFERENCE SIGNS | |
|---|---|
| 142 | output voltage module/boosting module |
| 143 | socket |
| 200 | mobile terminal |
| 300 | hydraulic device/CAN bus multi-way valve |

The invention claimed is:

1. A device for diagnosing and configuring a hydraulic device based on a wireless local area network, comprising:
a communication unit which is configured to be electronically connected to an electronic unit of the hydraulic device and configured to establish the wireless local area network; and
a mobile terminal which is configured to be connected to the communication unit via the wireless local area network in order to display diagnosis results of the hydraulic device and/or to change a configuration of the hydraulic device;
wherein the communication unit is configured to host a webpage which can be accessed by the mobile terminal when the mobile terminal is connected to the wireless local area network, and
wherein the communication unit and the mobile terminal use a communication protocol to communicate with each other,
wherein the communication unit comprises:
a first processing module in which a wireless communication module is built, wherein the first processing module is in wireless communication with the mobile terminal through the wireless communication module; and
a second processing module which is connected between the first processing module and the hydraulic device.

2. The device according to claim 1, wherein:
the communication unit is configured to read status data of the hydraulic device in response to a diagnosis event, and process the status data to generate a webpage text diagnosis result; and
the mobile terminal is configured to receive the webpage text diagnosis result and display the diagnosis result in a webpage form.

3. The device according to claim 2, wherein:
the first processing module is configured to transmit a read instruction in response to the diagnosis event;
the second processing module is configured to read the status data of the hydraulic device in response to the read instruction and transmit the status data to the first processing module; and
the first processing module is configured to process the status data to generate the webpage text diagnosis result, and transmit the webpage text diagnosis result to the mobile terminal through the wireless communication module.

4. The device according to claim 2, wherein a storage module is further connected to the first processing module and configured to store the diagnosis result processed by the first processing module; and when the mobile terminal transmits a download instruction, the first processing module downloads the diagnosis result from the storage module and transmits the diagnosis result to the mobile terminal.

5. The device according to claim 2, wherein the status data comprises at least one of a fault code, a fault occurrence time, a running status, a running time, and a sensor status.

6. The device according to claim 1, wherein:
the communication unit is configured to modify the configuration of the hydraulic device in response to a configuration request received via the webpage from the mobile terminal.

7. The device according to claim 6, wherein:
the first processing module is configured to transmit a write instruction in response to the configuration request; and
the second processing module is configured to change the configuration of the hydraulic device in response to the write instruction.

8. The device according to claim 1, wherein the communication unit further comprises an indicator lamp module, the indicator lamp module comprising:
an LED lamp comprising at least one set of red, green and blue three-color lamps; and
a third processing module which is connected between the first processing module and the LED lamp and configured to control the LED lamp to be turned on based on a processing process of the first processing module.

9. The device according to claim 8, wherein:
when the first processing module is in a diagnosis state, the third processing module controls a blue lamp in the LED lamp to be turned on;
when the diagnosis result of the first processing module indicates that the hydraulic device is normal, the third processing module controls a green lamp in the LED lamp to be turned on; and
when the diagnosis result of the first processing module indicates that the hydraulic device has a fault, the third processing module controls a red lamp in the LED lamp to be turned on.

10. The device according to claim 1, further comprising:
the hydraulic device, wherein the hydraulic device comprises the communication unit.

11. The device according to claim 1, further comprising a separate communication device comprising the communication unit;
wherein the communication unit is connected to the hydraulic device via a serial bus.

12. The device according to claim 11, further comprising:
an other hydraulic device;
wherein the communication unit is connected to the other hydraulic device via the serial bus and configured to perform a diagnosis of the other hydraulic device in response to a diagnosis event and to perform a configuration of the other hydraulic device in response to a configuration request transmitted by the mobile terminal.

13. The device according to claim 11, wherein the communication device further comprises a power supply module, and the power supply module comprises:
an input voltage module which is connected to a socket and configured to adapt a voltage of an external power supply connected to the socket to a voltage value required for charging a battery of the communication device, and to charge the battery; and/or
an output voltage module which is connected to the battery and configured to adapt the voltage of the battery to a working voltage value of the communication device to supply power to the communication device.

14. The device according to claim 1, wherein the hydraulic device is a hydraulic valve, a CAN bus multi-way valve, or a hydraulic pump.

15. A device for diagnosing and configuring a hydraulic device based on a wireless local area network, comprising:
- a communication unit which is configured to be electronically connected to an electronic unit of the hydraulic device and configured to establish the wireless local area network; and
- a mobile terminal which is configured to be connected to the communication unit via the wireless local area network in order to display diagnosis results of the hydraulic device and/or to change a configuration of the hydraulic device;
- a separate communication device comprising the communication unit; and
- an additional hydraulic device;
- wherein the communication unit is configured to host a webpage which can be accessed by the mobile terminal when the mobile terminal is connected to the wireless local area network,
- wherein the communication unit and the mobile terminal use a communication protocol to communicate with each other,
- wherein the communication unit is connected to the hydraulic device via a serial bus, and
- wherein the communication unit is connected to the additional hydraulic device via the serial bus and configured to perform a diagnosis of the additional hydraulic device in response to a diagnosis event and to perform a configuration of the additional hydraulic device in response to a configuration request transmitted by the mobile terminal.

16. The device according to claim 15, wherein the communication device further comprises a power supply module, and the power supply module comprises:
- an input voltage module which is connected to a socket and configured to adapt a voltage of an external power supply connected to the socket to a voltage value required for charging a battery of the communication device, and to charge the battery; and/or
- an output voltage module which is connected to the battery and configured to adapt the voltage of the battery to a working voltage value of the communication device to supply power to the communication device.

* * * * *